United States Patent [19]

Willman

[11] Patent Number: 5,418,956
[45] Date of Patent: May 23, 1995

[54] METHOD AND SYSTEM FOR AVOIDING SELECTOR LOADS

[75] Inventor: Bryan M. Willman, Kirkland, Wash.

[73] Assignee: Microsoft Corporation, Redmond, Wash.

[21] Appl. No.: 843,994

[22] Filed: Feb. 26, 1992

[51] Int. Cl.$^6$ ............................................. G06F 9/46
[52] U.S. Cl. .................. 395/700; 364/DIG. 1; 364/241.2; 364/241.3; 364/241.6; 364/261.6; 364/261.3; 364/261.9; 364/247; 364/247.8; 364/280
[58] Field of Search ............... 395/650, 700, 375, 775, 395/725

[56] References Cited

U.S. PATENT DOCUMENTS

| | | | |
|---|---|---|---|
| 4,342,082 | 7/1982 | Brown et al. | 364/200 |
| 4,935,870 | 6/1990 | Burk, Jr. et al. | 364/200 |
| 4,947,316 | 8/1990 | Fisk et al. | 364/200 |
| 5,047,919 | 9/1991 | Sterling et al. | 364/200 |
| 5,167,023 | 11/1992 | de Nicolas et al. | 395/375 |

OTHER PUBLICATIONS

Hummel, Robert L., "*Programmer's Technical Reference: The Processor and Comprocessor,*" Ziff–Davis Press, Emeryville, Calif., 1992, pp. 85–105, 153–182, and 303–330.

*Primary Examiner*—Kevin A. Kriess
*Attorney, Agent, or Firm*—Seed & Berry

[57] ABSTRACT

An improved method and system for reducing the number of segment register loads that occur during the transfer of control from an application program to an operating system routine is provided. In preferred embodiments on an Intel 80386 processor, an application program and operating system kernel share a code segment address space and a data segment address space from 0 to 4G. During the execution of the application program, which executes in user mode, a page table is defined to prevent the application program from accessing pages which correspond to the address space of 2G to 4G. When the application program invokes a system routine, the system routine does not need to load the data segment register since the application program and the kernel share the same data segment. If an application program does load the data segment register with a selector other than the selector for the shared data segment, then when the kernel tries to access memory using the data segment register, an exception is generated. The exception handler restores the selector for the shared data segment into the data segment register and resumes execution of the instruction which caused the exception.

28 Claims, 7 Drawing Sheets

|  | Selector | Base | Limit | Attributes |
|---|---|---|---|---|
| CS |  |  |  |  |
| SS |  |  |  |  |
| DS |  |  |  |  |
| ES |  |  |  |  |
| FS |  |  |  |  |
| GS |  |  |  |  |

SEGMENT REGISTERS    SEGMENT DESCRIPTOR CACHE REGISTERS

*Figure 3*
(Prior Art)

METHOD AND SYSTEM FOR AVOIDING SELECTOR LOADS

TECHNICAL FIELD

This invention relates generally to a method in a computer system for reducing the overhead of issuing a system call and, more specifically, to a method of reducing the number of segment register loads that occur during system calls and interrupt processing.

BACKGROUND OF THE INVENTION

Computer operating systems provide various services to the application programs that execute under the control of the operating system. These services facilitate use of the computer resources. For example, a system routine may provide services to control the writing of data to a printer. A program that wants to print issues a system call to the print routine specifying the data to print. The system print routine controls the details of ensuring that the specified data is printed. Another service that operating systems provide is the allocation of the computer resources (e.g., processor time and memory) among various tasks (programs). One example of resource allocation is multitasking. A multitasking operating system stores several tasks in memory. The operating system allocates one task to use the processor for awhile, then another task, and so on. Thus, there are multiple tasks in various stages of execution which cooperatively share the processor under the control of the operating system.

A primary requirement of a multitasking operating system is to provide a robust and secure operating environment for each task. Each task executes as if it is the only task currently executing on the computer. The operating system must ensure that one task cannot unintentionally or intentionally affect the execution of another task without permission from the other task. To ensure that one task will not affect the execution of another task, an operating system typically ensures that one task does not have access to memory allocated to another task or the operating system. Computers typically provide memory protection hardware to assist in controlling access to memory.

Some microprocessors, such as the Intel 80386 microprocessor, provide memory protection that is integrated with their addressing architecture. FIG. 1 shows an overview of the addressing architecture of the Intel 80386 microprocessor. The addressing architecture uses both a segmentation and paging scheme. Programs specify addresses in a virtual address space. Virtual addresses are segmented and contain a 16-bit segment selector 101 and a 32-bit offset 102. The segmentation system 103 maps virtual addresses to 32-bit linear addresses 104. The paging system 105 then maps linear addresses to 32-bit physical addresses 106. The physical addresses are sent to memory to effect the addressing of a memory location.

FIG. 2 shows the segmentation system of the 80386, which maps a virtual address to a linear address. The virtual address has a segment selector 201 and an offset 202. The segment selector 201 contains an index into a segment descriptor table 203. The segment descriptor table, which is stored in memory, contains an entry for each segment currently defined. A segment is a logically contiguous area of memory. The segment descriptor table entries contain a 32-bit segment base address 204, a 32-bit segment limit 205, and an attributes field 206. The segment base address 204 contains the base address of a segment in the linear address space. The segment limit 205 contains the size of the segment. The attributes field 206 indicates the segment access rights, which include read, write, and execute. A linear address 209 is formed by adding the base segment address 208, which is pointed to by the segment selector 201, to the offset 202. The segmentation system supports memory protection by ensuring that an offset is not larger than the segment limit and that access is consistent with the segment access rights.

The 80386 provides registers for holding segment selectors. The segment registers include the stack segment register (SS), the code segment register (CS), the main data segment register (DS), and three extra segment registers (ES, FS, GS). Virtual addresses are specified by segment register and offset. For example, the virtual address specified as DS:1F1h (the "h" indicating a hexadecimal number) indicates the virtual address formed by the segment selector in the DS register and offset 1F1h. It would increase system overhead if on every memory reference, the segment descriptor table was accessed to retrieve the base address of a segment. To improve performance, the 80386 provides a cache register for each segment register. Each cache register contains the segment descriptor table entry that is indexed by segment selector in the corresponding segment register. FIG. 3 shows the segment registers and the corresponding segment descriptor cache registers. When a segment register is loaded with a segment selector, the processor retrieves an entry from the segment descriptor table using the segment selector as the index and stores the segment base address, the segment limit, and segment attributes in the corresponding segment descriptor cache register. The processor also performs various checks to ensure the integrity of the load. For example, the processor compares the current privilege level with the privilege level of the segment, ensures that the segment descriptor is valid, ensures that the segment type (read, write, execute status) is consistent with the segment register, and ensures that the selector index is within the descriptor table limit. When generating a linear address, the processor retrieves the segment base address from the segment descriptor cache register and adds an offset. Thus, the loading of a segment register is a relatively slow process because of the steps involved in accessing the segment descriptor table (which resides in memory) and loading the segment descriptor cache register. However, the forming of linear addresses occurs quickly because the segment base address is already in the descriptor cache register and can be retrieved quickly.

FIG. 4 shows the paging system of the 80386, which maps a linear address to a physical address. The 32-bit linear address 401 has a 12-bit offset 402 and a 20-bit page table index 403. The 80386 page size is 4K bytes. The page table 404 contains a 32-bit entry for each page defined in the system. (The 80386 actually uses a two-tier page table, but the details are not necessary to understand the present invention.) The entries contain a 12-bit attributes field 406 and a 20-bit page frame address 405. To support memory protection, the attributes field 406 contains a flag indicating whether the page can be accessed when the processor is user or kernel mode (explained below). The page frame address 405 is the base address of the corresponding page in physical memory. The paging system uses the page table index 403 as an index into the page table 404. The physical address 408 is formed with the indexed page frame address 407 in the high order bits and the offset 402 in the low order bits.

The 80386 processor provides privilege levels to help ensure a secure operating environment for each task. The 80386 processor supports four execution privilege levels: 0, 1, 2, and 3. When a task is executing in privilege level 0 (kernel mode), it has access to all the computer resources (e.g., memory and instruction set). Conversely, when a task is executing in privilege level 3 (user mode), it has access to only a limited set of the computer resources.

The 80386 processor provides independent protection controls in both the segmentation and paging systems. The segmentation system includes privilege level, read/write/execute access, and offset limit protection for each segment. The segmentation system ensures that the current privilege level is consistent with the segment privilege level, that the read/write/execute access is consistent with the segment register, and that the offset is less than the limit. The paging system includes privilege level and read/write/execute access protection for each page. The paging system ensures that the current privilege level is consistent with page privilege level and that the read/write/execute access is consistent with the access being attempted.

SUMMARY OF THE INVENTION

It is an object of the present invention to provide a system for reducing the number of segment register loads that occur during a system call.

It is another object of the present invention to provide a system to avoid segment register loads during process or thread switch time.

It is another object of the present invention to ensure that the operating system provides a secure environment for each task.

It is another object of the present invention to provide an operating system in which a data segment register is loaded during the execution of a system routine only when the application program has loaded the data segment register with a selector other than a predefined selector.

It is another object of the present invention to provide a method in a computer system for loading a data segment register that has been loaded by an application program.

It is another object of the present invention to provide a method and operating system for reducing the loading of the data segment register during the processing of an interrupt.

It is another object of the present invention to provide a method for allowing the processor protection mechanism to detect that an application program has replaced a value in a segment register without the explicit execution of instructions to check the segment register.

These and other objects, which will become apparent as the invention is more fully described, are obtained by providing an improved method and system in a computer for loading a data segment register during the execution of a system routine. In a preferred embodiment, the computer has a segment and page addressing architecture with both segment-level and page-level protection. The computer has a segment descriptor table, which defines a plurality of segments and a page table, which defines a plurality of pages. The system loads the segment descriptor table with the definition of data segment, provides an exception handler for storing a selector for the defined data segment into the data segment register, loads the page table to indicate that certain pages of the data segment are accessible only in kernel mode and other pages accessible in both user and kernel modes, loads operating system routines into pages that are accessible only in kernel mode, loads the data segment register with the selector for the defined data segment, loads an application program into pages that are accessible in user mode, and begins the execution of the application program in user mode. During the execution of the application program, control is transferred to an operating system routine wherein the computer mode switches to kernel mode. During the execution of the operating system routine, control is transferred to an instruction that uses the data segment register, an exception is generated when the data segment register contains a selector other than the selector for the defined data segment, the exception handler stores the selector for the defined data segment into the data segment register, and control is transferred back to the instruction that uses the data segment register.

BRIEF DESCRIPTION OF THE DRAWINGS

FIG. 3 shows the segment registers and the corresponding segment descriptor cache registers in an Intel 80386/microprocessor.

DETAILED DESCRIPTION OF THE INVENTION

Figure 1:
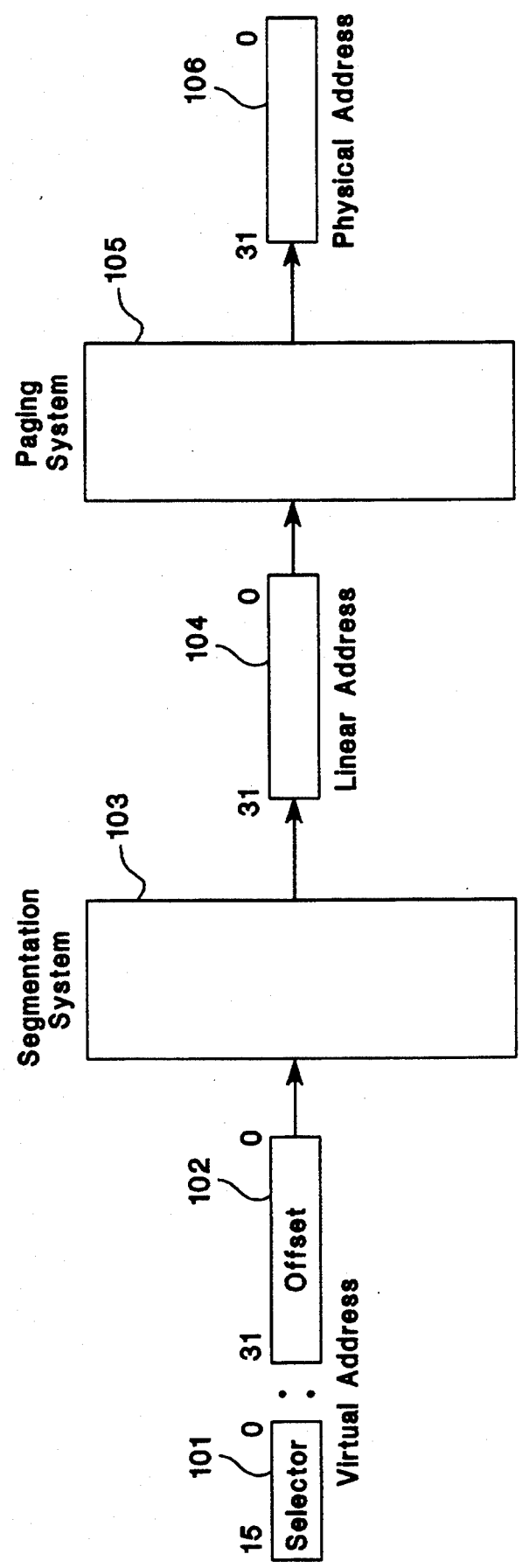
FIG. 1 shows an overview of the addressing architecture of the Intel 80386 microprocessor.
Figure 2:
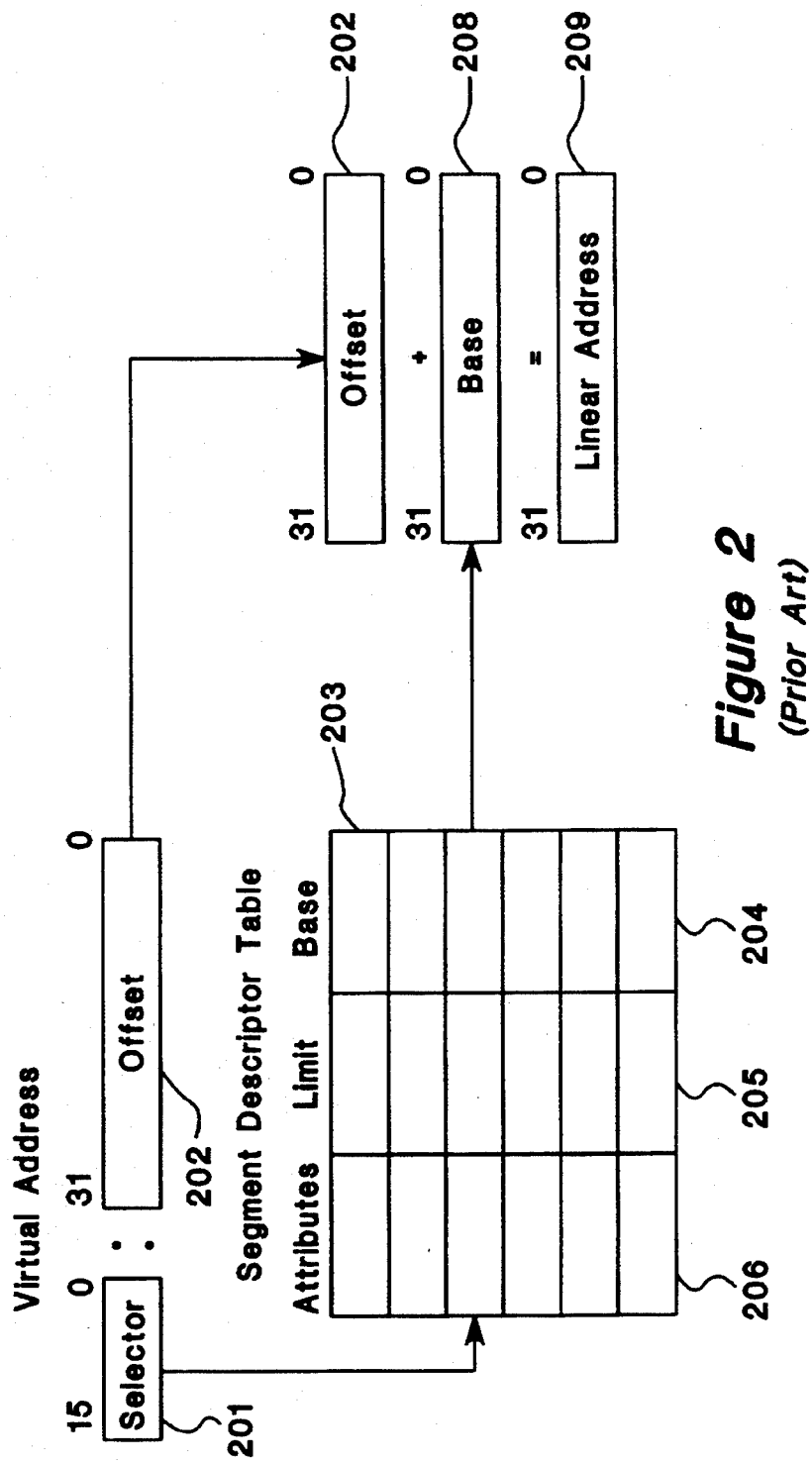
FIG. 2 shows an overview of the segmentation system of the Intel 80386 microprocessor.
Figure 4:
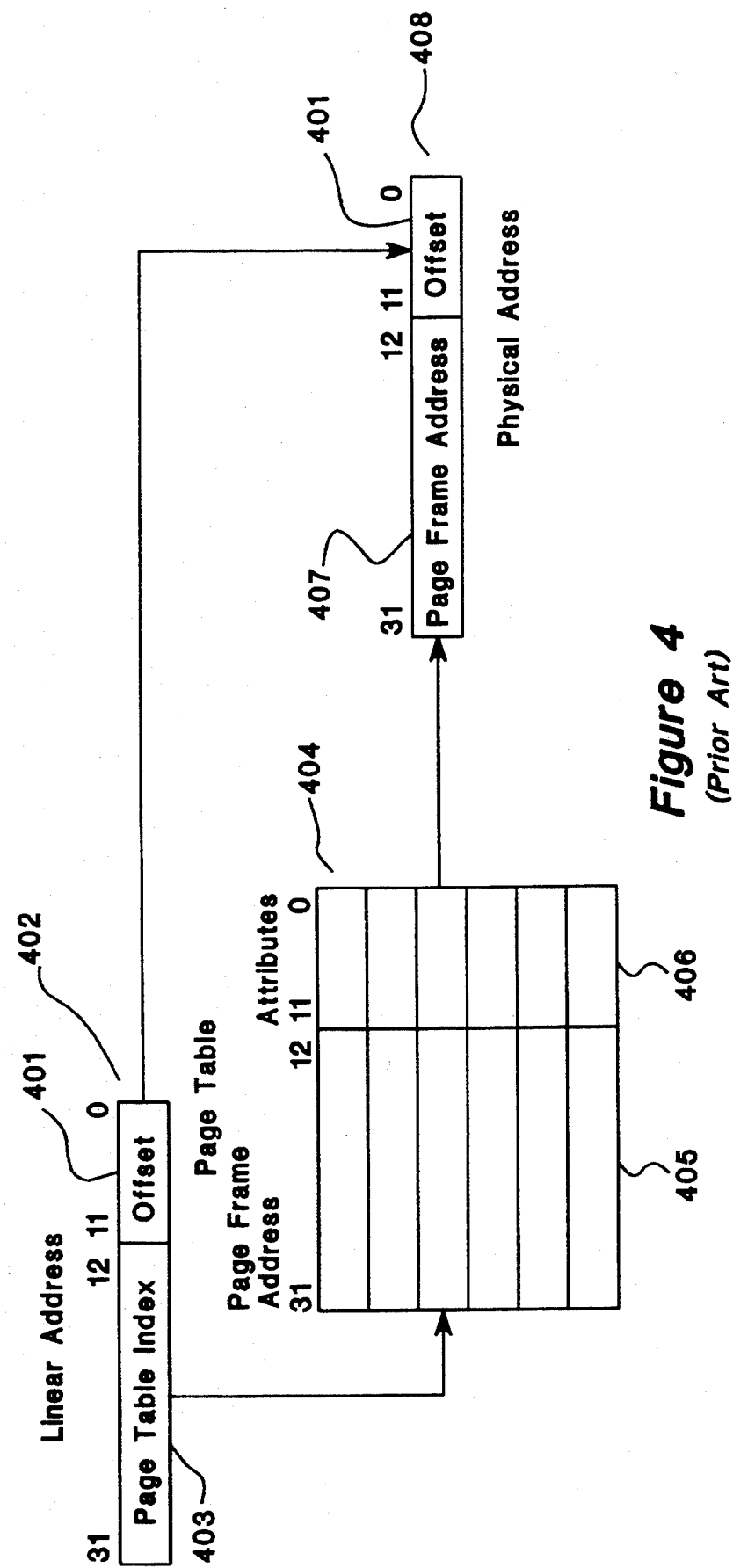
FIG. 4 shows an overview of the paging system of the Intel 80386 microprocessor.

The present invention provides for reducing the number of segment registers that are loaded during a system call and during interrupt processing on a processor with a segmented addressing architecture. The present invention is described in terms of a preferred embodiment on a computer with an Intel 80386 processor. One skilled in the art would appreciate that the methods of the present invention can be practiced on other processors that have a segmented architecture. In a preferred embodiment, the operating system supports multitasking. The tasks operate in a virtual address space 0 to 4 G bytes. The task address space .comprises an application portion and a kernel portion. The kernel is that part of the operating system which supports lower level services, such as task scheduling and memory allocation. An application program is allocated the address space from 0 to 2 G bytes (user address space). The kernel is allocated the address space from 2 G bytes to 4 G bytes (kernel address space). An address space of 0 to 4 G bytes allows a task to execute within one code segment and data segment. Thus, the application program has no need to switch from one code or data segment to another. These application programs, which use only one code and one data segment, are referred to as flat applications. One skilled in the art would appreciate that other user and kernel address space ranges could be used. For example, the user address space could range from 0 to 1 G byte, and the kernel address space could range from 1 G to 2 G byte.

In a preferred embodiment, when a task is created, the operating system defines a user code segment and user data segment to have a base address of 0 and a limit of 4 G bytes. One skilled in the art would appreciate that the base address and limit can vary; however, as discussed below, the user code and data segments preferably encompasses both the user address space and kernel address space. The operating system also defines a kernel code segment and a kernel data segment. In a preferred embodiment, the kernel code segment and the kernel data segment have the same base address, same limit, and attributes as the user code segment and the user data segment, respectively.

When a task is executing application code, the segment descriptor table contains the user code segment descriptor and the user data segment descriptor, and the processor is in user mode. In a preferred embodiment, the application code is prevented from accessing data above 2 G bytes by the paging system. Each page above 2 G bytes is marked as accessible in kernel mode only. Thus, an exception is generated when an application program tries to access data above 2 G bytes. This ensures that an application program cannot arbitrarily overwrite memory reserved for the kernel. When the application code invokes a system routine (i.e., makes a system call), the processor switches to kernel mode and switches to the code segment specified by the gate used to invoke the routine. In a preferred embodiment, both the DS and ES registers contain the user data segment selector when control is transferred to the kernel code. Since the user data segment selector defines the same segment as the kernel data segment and since the DS and ES registers contain the user data segment selector, the kernel code does not need to load the DS and ES registers during a system call. If an application program loads either the DS or ES register with a value other than the user code segment selector, the kernel detects such an occurrence and loads the DS and ES registers with the kernel data segment selector during a system call. As discussed below in detail, the methods of the present invention reduce the number of segment register loads that occur when a system call is invoked.

There are two types of applications: a flat application and a non-flat application. A flat application does not load the segment registers. The code and data of a flat application each reside within a single segment. A flat application preferably uses 32-bit offset addressing. A non-flat application generally uses a 16-bit offset addressing. The methods of the present invention reduce the loading of a data segment register by loading the data segment register only when a flat application overwrites the user data segment selector.

Figure 5:
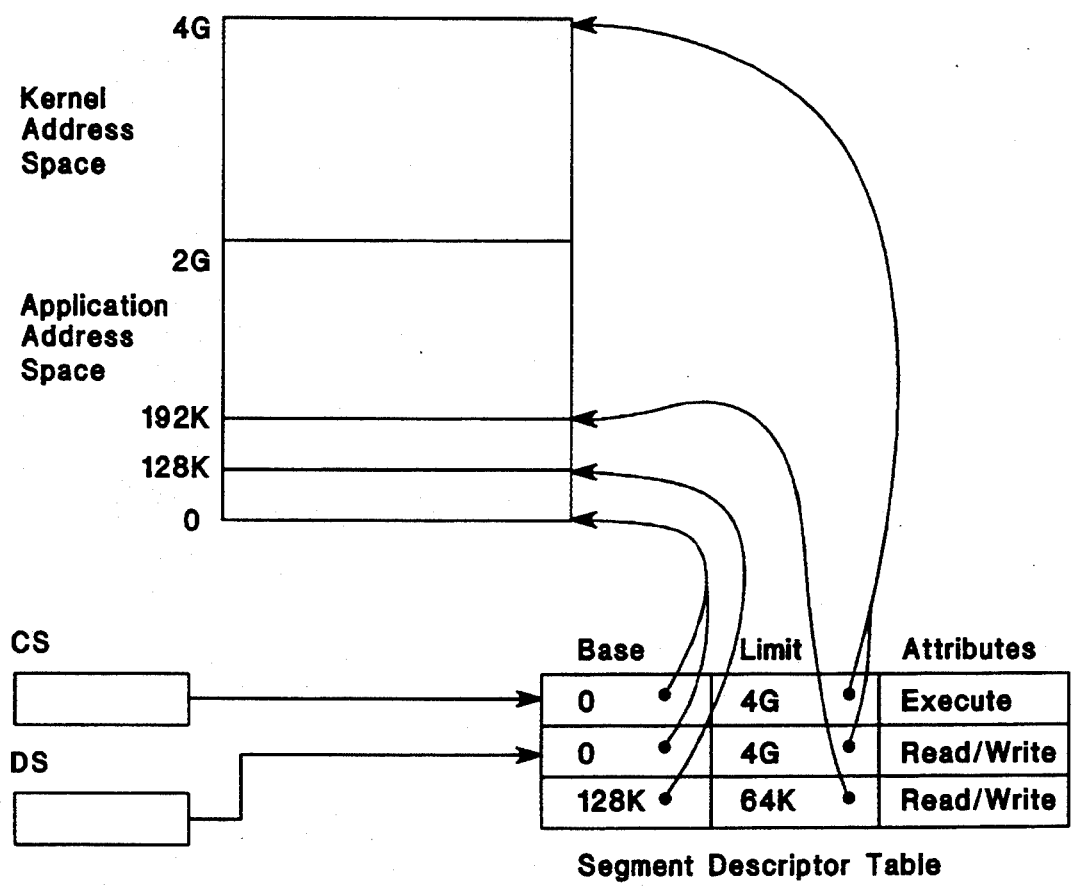
FIG. 5 shows the application and kernel address spaces in a preferred embodiment.

FIG. 5 shows the user and kernel address spaces in a preferred embodiment. In a preferred operating system, the application program is allocated the address space from 0 to 2 G bytes. The kernel is allocated the address space from 2 G bytes to 4 G bytes. When a task is started its segment descriptor table contains a code segment entry, a data segment entry, and, optionally, a thread environment block (TEB) entry. The code segment entry defines the user code segment with a segment base address of 0, a segment limit of 4 G bytes, and an attribute of execute. The data segment entry defines the user data segment with a segment base address of 0, a segment limit of 4 G bytes, and an attribute of read/write. The TEB segment, for example, has a segment base address of 128K and a segment limit of 64K bytes and an attribute of read and write. The TEB segment is used to illustrate that other segments can be defined for the task. The task, however, should not access these segments using the DS and ES registers. In a preferred embodiment, the kernel code controls access to the descriptor tables. The kernel ensures that each segment, such as the TEB segment, with a non-zero base address has a limit of less than 2 G bytes. The kernel also preferably translates an application request for a segment with a zero base address and a limit greater than 2 G to a segment with a zero base address and a limit of 4 G. This translation does not affect the execution of the application program.

A task preferably invokes a system call through a software interrupt using the INT instruction. The INT instruction transfers control to the location specified in the interrupt descriptor table (IDT). In a preferred embodiment, that location is in the kernel address space. The IDT entry also specifies that the privilege level is to change to level 0 (kernel mode). While executing the INT instruction, the processor saves the CS and SS registers and loads the CS and SS registers with new values. Since the processor switches to kernel mode, the pages in the kernel address space, which were inaccessible in user mode, are now accessible. The kernel code starts execution assuming that the DS and ES registers contain the user code segment selector.

However, an application program can change the value in the DS or ES register. The DS or ES register can have one of four selector values: (1) the user data segment selector, (2) the user code segment selector, (3) another segment selector, or (4) the null segment selector. If the application code tries to load the DS or ES register with any other value, an invalid selector exception would have been generated because the selector would not be in the segment descriptor table. The following will be described with reference to the DS register; however, one skilled in the art would appreciate that the method of the present invention could be used in conjunction with any of the data segment registers.

If the DS register contains the user data segment selector, then the kernel proceeds with its normal operation. There is no need to load the DS register since it already is loaded with the expected selector value.

If the DS register does not contain the user data segment selector, then it contains one of the other three selector values. The kernel code must load the DS register with the user data segment selector to ensure correct operation. The kernel code could always reload the DS register with the user data selector. However, since the loading of a segment register is a relatively slow process, the loading of the DS register during every system call would increase system overhead. Alternatively, the kernel code could always check the DS register to determine if it contains the user data segment selector and if it does not, the kernel code would load the DS register with the user data segment selector. Although this approach would only load the DS register when necessary, the checking of the DS register during every system call would also add to the system overhead.

In a preferred embodiment, the present invention provides a method of detecting that the DS register does not contain the user data segment selector. An exception is generated whenever the kernel code accesses memory with an unexpected DS register value. A description of what occurs in the kernel code when invoked with an unexpected DS register value will help to illustrate the detection.

If a task invokes a system call while the DS register contains the user code segment selector, different events will occur depending on whether the kernel code reads or writes using the DS register. If the kernel reads, the read will work as expected. Since the user code segment has the same base address as the user data segment, the read will access the expected memory location. Also, since the attributes of the user code segment preferably indicate execute/read, reading does not cause an exception. However, when the kernel writes using the DS register, an exception is generated because the attributes for the user code segment does not specify write access.

If a task invokes a system call while the DS register is loaded with the null selector, then an exception is generated when the kernel code first attempts to access data using the DS register.

If a task invokes a system call while the DS register is loaded with another [TEB-type] selector, then the result depends on the segment read/write attributes and on whether the base address of the segment is zero. If the segment read/write attributes are not consistent with the type of kernel access, then an exception is generated when the kernel tries to access the segment.

If the base address is not zero, then an exception is generated whenever the kernel code accesses its data using the DS register. As described above, the kernel ensures that each segment with a non-zero base address has a limit less than 2 G. Thus, when the kernel accesses its data, which by definition is with an offset greater than 2 G, using the DS register, an exception is generated. If the DS register were to reference a segment with a non-zero base address and a limit greater than 2 G, then the wrong linear address would be generated when the kernel accesses its data. For example, if the segment base address was 64K and the segment limit was 4 G, then an access to kernel data would generate a linear address that is off by 64K bytes. If the kernel code accesses data below the segment limit, it is possible that a task could cause the kernel to overwrite the application data. However, since the task could overwrite the application data when in user mode, the overwriting by the kernel code would not present any system security problems.

If the base address of the segment is zero, then the segment limit is either less than 2 G or greater than 2 G. If the limit is greater than 2 G, then an exception may not be generated, but since the base address is zero, the kernel is accessing the correct memory. If the limit is less than 2 G, then an exception is generated whenever the kernel tries to access its data, which is at an offset greater than the limit.

In a preferred embodiment, the kernel code that implements the system calls assumes that the DS register will be loaded with the user data segment selector. In a preferred embodiment, it is a programming error for an application program to load the DS register with a selector other than the user data segment selector. However, as discussed above, whenever the DS register has an unexpected value, an exception is generated. The exception on the 80386 processor is a general protection fault. The exception handler loads the DS register with the user data segment selector. Upon return from the system call, the DS register contains the user data segment selector.

Figure 6:
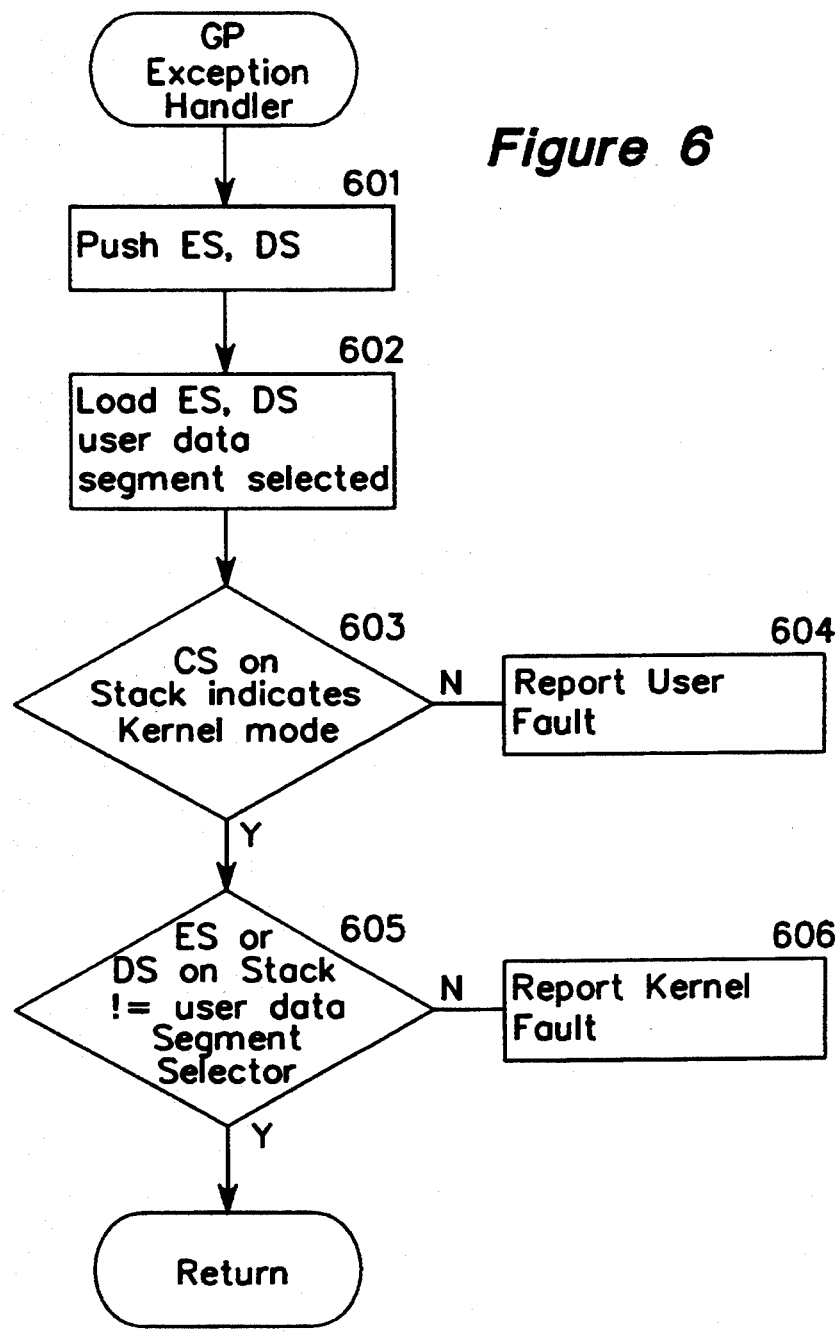
FIG. 6 is a flow diagram for the general protection exception handler in a preferred embodiment of the present,invention.

FIG. 6 is a flow diagram of the exception handler for general protection faults in a preferred embodiment of the present invention. The handler detects when the exception is caused as a result of the DS or ES register having a value other than the user data segment selector, loads the user data segment selector into the DS and ES registers, and returns to the faulting instruction. The kernel code can then process the system call with the expected DS and ES values. The handler first loads the DS and ES registers with the user data segment selector. If the DS and ES register did not contain the user data segment selector when the exception occurred and the exception occurred while in kernel mode, the handler returns to the faulting instruction. Otherwise, the exception is reported. When the kernel returns to the application program, the DS and ES registers will not have the same value as when the system call was invoked. However, this does not compromise system security because it was an error for the application to load the unexpected selector value. Upon entry to the handler, the stack contains the CS selector and EIP offset of the instruction that caused the exception. Referring to FIG. 6, in step 601, the handler pushes the DS and ES registers onto the stack. In step 602, the handler loads the DS and ES registers with the user data segment selector. This ensures that the handler has the correct selector in the DS and ES registers during execution of the handler. In step 603, if the task was in kernel mode when the exception occurred, then the exception may have been caused by the DS or ES register containing a value other than the user data segment selector and the handler continues at step 605, else the exception occurred while in user mode and the handler continues at step 604. The handler determines whether the task was in kernel mode when the exception occurred by examining the CS selector of the instruction that caused the exception, which is on the stack. In step 604, the handler performs the standard user mode exception processing. In step 605, if the DS or ES selector that was pushed onto the stack is not equal to the user data segment selector, then the handler returns to the faulting instruction, else the handler continues at step 606. When the handler returns to the faulting instruction, the DS register contains the user data segment selector as it was loaded in step 602. In step 606, the handler performs the standard kernel mode exception processing. The handler produces the correct result if the fault occurred for some reason other than an unexpected DS or ES register value. The handler assumes that the fault was due to an unexpected DS or ES register value, loads the DS and ES registers with the user code segment selector, and returns to the faulting instruction. If the exception was not generated as a result of an unexpected DS or ES register value, then the faulting instruction causes another fault. At this point, the handler detects that the DS and ES registers contain the user data segment selector in step 605 and reports that a kernel mode exception occurred which was not a result of an unexpected value in the DS or ES register.

The methods of the present invention also allow the interrupt routines of the operating system to expect that the DS and ES registers contain the user code segment selector when an interrupt occurs. Thus, the interrupt routines need not save and restore these segment registers. If an interrupt occurs while a task is in user mode and while the DS or ES register contains a value other than the user data segment selector, the interrupt routine (which executes in kernel mode) causes an exception to occur under the same conditions as described above during a system call. The handler loads the DS and ES registers with the user data segment selector and returns to the faulting instruction. When the interrupt routine returns, the DS and ES registers do not have the same value as when the interrupt occurred. However, it was an error for the application code to change the selector in the DS and ES registers. Thus, the resetting of the DS and ES registers is caused by that error.

If an interrupt occurs while a task is in kernel mode and while the DS or ES register contains a value other than the user data segment selector, the interrupt routine returns with the DS and ES registers loaded with the user data segment selector, as expected by the kernel code.

In a preferred embodiment, if a task switch is to occur the kernel code ensures that a write is performed using the DS and ES registers. If the registers contained an unexpected value, then the interrupt handler resets the registers before switching to the new task.

The methods of the present invention allow non-flat applications to execute correctly in conjunction with kernel code that expects the DS register to contain the user data segment selector.

The non-flat applications use an application programming interface (API) to invoke system calls. The API code is linked into the user address space. These APIs save the DS and ES register values and set the DS and ES registers to the user code segment selector. When a system call is invoked by the API code, the DS and ES registers contain the expected selector. When the system call returns to the API code, the API restores the saved DS and ES register values before returning to the application. Thus, the application program has the DS and ES selectors it expects. Similarly, the kernel code has the DS and ES selectors it expects.

There are several ways in which to ensure that the DS and ES registers are correctly set when a non-flat application is interrupted. Upon entry, each interrupt routine could save the DS and ES registers and load the DS and ES registers with the user code segment selector. Upon exit, the routines would restore the saved DS and ES register values. The disadvantage of this method is that the overhead of loading the DS and ES registers (although necessary for non-flat applications) is incurred when the execution of a flat task is interrupted. Alternatively, the interrupt routine could check the DS and ES registers to see if they contain an unexpected value. If an unexpected value is found, the unexpected value is saved and the register is loaded with the user code data segment selector. When the interrupt routine exits, it restores the saved segment selector.

Figure 7:
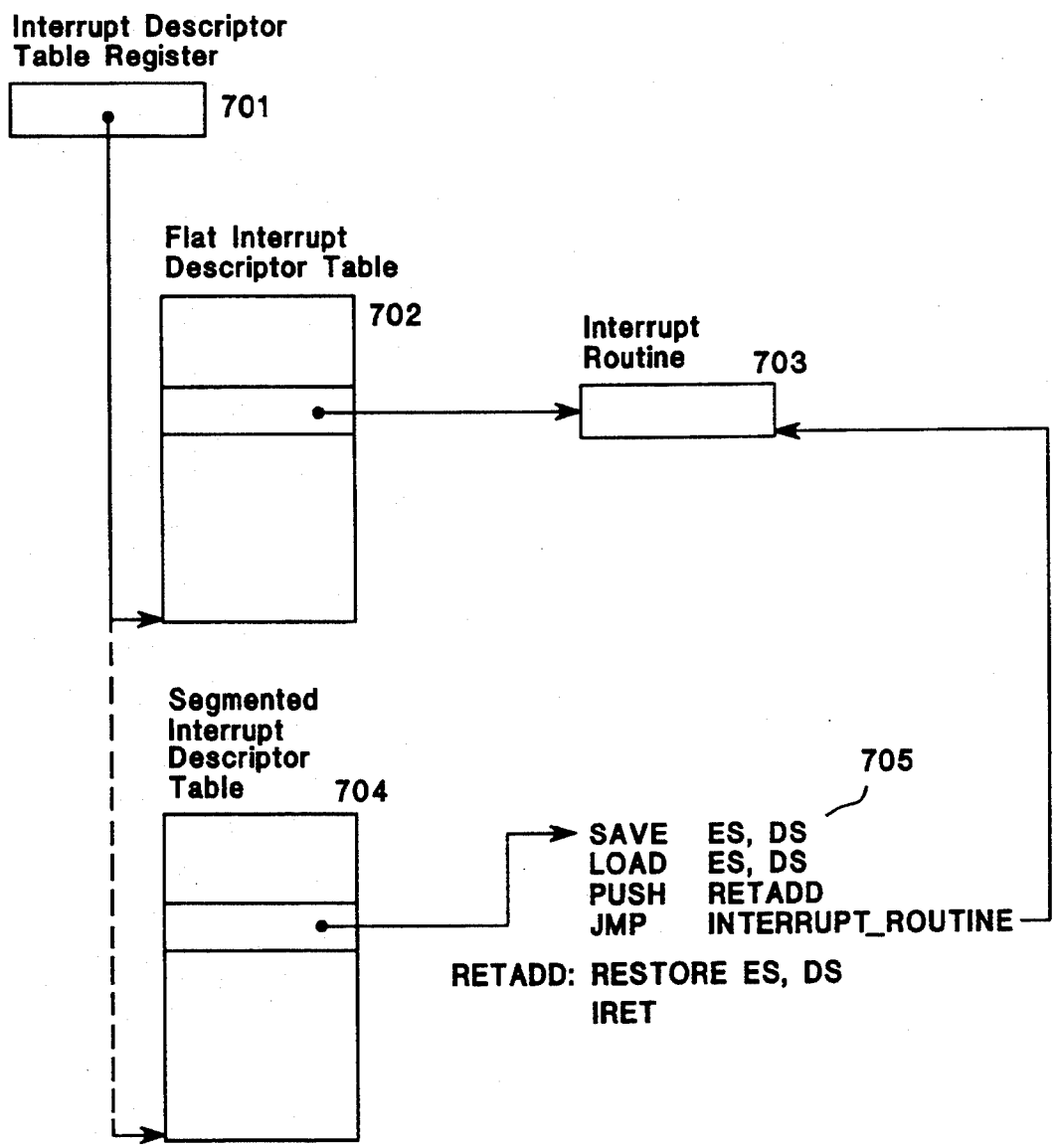
FIG. 7 shows the interrupt tables for flat and non-flat tasks in a preferred embodiment.

In an alternate embodiment, the operating system knows which tasks are flat and which tasks are non-flat. In one embodiment, the interrupt routines check to see if a non-flat task was interrupted. If the non-flat task was interrupted, the routine saves the DS and ES register values and loads the user code segment selector into the DS and ES registers. Upon exit, the interrupt routine restores the saved register values. Alternatively, the operating system defines an interrupt descriptor table (IDT) for flat tasks and one for non-flat tasks. The IDT for the non-flat tasks points to interrupt routines that save and restore the DS and ES registers. Conversely, the IDT for the flat tasks points to interrupt routines which assume that the DS and ES registers are loaded with the user data segment selector. FIG. 7 shows the interrupt tables for flat and non-flat tasks. When a flat task is executing, the interrupt descriptor table register (IDTR) 701 is set to point to the flat IDT 702. The flat IDT 702 points to interrupt routines 703 that expect the user code segment selector in the DS and ES registers. When a flat task is executing, the DS and ES registers are not saved and restored by the interrupt routines. When a non-flat task is executing, the IDTR 701 points to the non-flat IDT 704. The non-flat IDT 704 points to code 705 that saves the DS and ES registers, loads the DS and ES registers with the user code segment selector, pushes a return address for the interrupt routine, and jumps to the interrupt routine 703. The interrupt routine 703 executes expecting the DS and ES register to contain the user code segment selector. To return, interrupt routine 703 executes the return from interrupt instruction (IRET). Control is transferred to the return address that was pushed onto the stack by code 705. Code 705 then restores the DS and ES registers to the interrupted values and executes an IRET instruction to return to the interrupted instruction.

Although the present invention has been described in terms of a preferred embodiment operating on an Intel 80386, the methods of the present invention can be used in other processors that have a segmented addressing and paging architecture. For example, the present invention can be used on the Intel 80486 processor and other compatible processors. Modifications within the spirit of the invention will be apparent to those skilled in the art. The scope of the present invention is defined by the claims that follow.

I claim:

1. A method in a computer for demand loading a data segment register that has been loaded by an application program, the computer having a segment and page addressing architecture, the computer having a segment descriptor table to define a plurality of segments and a data segment register to contain a selector for selecting one of the plurality of segments, the computer having a page table to define a plurality of pages, the computer having a user mode and a kernel mode, the method comprising the computer-implemented steps of:

loading the segment descriptor table with the definition of a data segment;

providing an exception handler, the exception handler for storing the selector for the defined data segment into the data segment register;

loading the page table to indicate that certain pages of the data segment are accessible only in kernel mode and other pages accessible in both user and kernel modes;

loading operating system routines into pages that are only accessible in kernel mode;

loading the data segment register with the selector for the defined data segment;

loading an application program into pages that are accessible in both user and kernel modes;

executing the application program in user mode;

while executing the application program,
transferring control to an operating system routine wherein the computer mode switches to kernel mode; and while executing the operating system routine,
transferring control to an instruction that uses the data segment register;

generating an exception when the data segment register contains a selector other than the selector for the defined data segment;

executing the exception handler wherein the selector for the defined data segment is stored in the data segment register; and transferring control to the instruction that uses the data segment register.

2. The method of claim 1 wherein the application program executes an instruction to transfer control to an operating system routine.

3. The method of claim 1 wherein control is transferred to an operating system routine as a result of an interrupt.

4. An operating system in which a data segment register is loaded during execution of a system routine only when the application program has loaded the data segment register with a value other than a predefined value, the operating system comprising:

means for loading the data segment register with a predefined value;

means for executing an application program;

means for transferring control from the application program to a system routine;

means for generating an exception during the execution of an instruction that uses the data segment register when the data segment register has a value other than the predefined value;

an exception handler for loading the data segment register with the predefined value; and means for restarting the instruction that uses the data segment register.

5. A method in an operating system for reducing the loading of a data segment register, the operating system executing on a computer, the computer having an interrupt descriptor register, the interrupt descriptor register for pointing to an interrupt descriptor table, an interrupt descriptor table for pointing to a plurality of interrupt processing routines, the method comprising the computer-implemented steps of:

identifying an application program as being either flat or non-flat, wherein a flat application program uses a predefined segment register value;

defining an interrupt descriptor table for a non-flat application, the interrupt descriptor table containing pointers to interrupt routines that upon entry save the contents of the data segment register and upon exit load the data segment register with the saved contents;

defining an interrupt descriptor table for flat applications, the interrupt descriptor table containing pointers to interrupt routines that do not load the data segment register;

before transferring control to a non-flat application, setting the interrupt descriptor register to point to the interrupt descriptor table for non-flat applications; and before transferring control to a flat application, setting the interrupt descriptor register to point to the interrupt descriptor table for flat applications.

6. A method in a computer system for reloading a segment register with a predefined value, the segment register for referencing a segment of memory, the method comprising the computer-implemented steps of:

executing an instruction to access the segment of memory referenced by the segment register;

while executing the instruction, detecting that the segment register contains a value other than the predefined value; and when the segment register contains a value other than the predefined value, interrupting the execution of the instruction, loading the predefined value into the segment register, and restarting the execution of the instruction to access the segment of memory referenced by the predefined value loaded in the segment register.

7. A method in a computer system for minimizing the number of segment register loads that occur during transfer from an application program to an operating system, the application program having an address space, the operating system having an address space, the computer having a segmented architecture, the computer having a segment descriptor table for holding a plurality of segment definitions, a segment identified by a segment selector, the segment selector specifying one of the plurality of segment definitions in the segment descriptor table, a segment register for storing a segment selector, the computer having instructions for accessing memory wherein the address for an operand of the instruction is formed by using the segment register, the method comprising the computer-implemented steps of:

defining a first segment that encompasses the address space of the application program and the address space of the operating system;

defining a second segment that includes only portions of the address space of the application program;

loading the segment descriptor table with the definitions of the first and second segments;

loading the segment register with the selector for the first segment;

executing the application program;

loading the segment register with the selector of the second segment during the execution of the application program;

transferring control from the application program to the operating system;

executing an instruction for accessing memory in the address space of the operating system wherein the instruction uses the segment register to form the address of an operand of the instruction;

during the execution of the instruction, generating an exception indicating that that segment register contains the selector of the second segment rather than that of the first segment; and in response to the exception, loading the segment register with the selector of the first segment and restarting the execution of the instruction.

8. The method of claim 7 wherein a segment is defined by a base address and a limit, wherein the address for an operand is formed by adding an offset to the segment base address associated with the segment register, wherein the address space of the application program is in the lower offsets of the first segment and the address space of the operating system is in the higher offsets of the first segment, wherein the second segment has a limit that is less than the lowest offset in the first segment of the address space of the operating system, and wherein the step of generating an exception detects that the offset specified by the executing instruction exceeds the limit of the second segment.

9. The method of claim 7 wherein the computer system has a page architecture, the memory being divided into a plurality of pages, including the step of setting the pages of the address space of the operating system to be inaccessible while executing the application program.

10. A computer system for avoiding segment register loads, the computer system having a segment register and a memory, the memory being divided into segments and pages, each segment being identified by a segment selector, comprising:
   a segmentation system for generating a linear address from a virtual address, the virtual address comprising a segment selector and an offset;
   a segmentation protection system for specifying a segment offset limit for each segment and for generating an exception when a virtual address offset exceeds the segment offset limit associated with the segment selector;
   a paging system for generating a physical address from a linear address;
   a paging protection system for specifying which pages are accessible only in system mode and for generating an exception when in user mode and when accessing a page specified as being accessible only in system mode;
   an operating system for defining a flat segment to encompass a user address space and an operating system address space, and for setting the pages of the operating system address space to accessible only in system mode;
   means for loading the segment register with the selector for the flat segment;
   means for executing an application program in user mode wherein the application program accesses data in the user address space and wherein when the application program tries to access data in the operating system address space, the paging protection system generates an exception; and
   a transfer instruction for transferring control from application program to the operating system and switching modes from user to system mode, whereby the pages in the operating system address space are accessible to the operating system and whereby the segment register contains the selector for the flat segment.

11. A method in a computer system for executing an operating system function that is invoked by an application program, the computer system having an operating system, an application program, an exception handler, and a segment register, the segment register containing a reference to memory of the computer system, the method comprising the computer-implemented steps of:
   invoking the operating system function by the application program;
   determining whether the reference in the segment register is equal to a predetermined value; and
   when the reference in the segment register does not equal the predetermined value,
      generating an exception;
      invoking the exception handler to handle the generated exception wherein the exception handler stores the predetermined value into the segment register; and
   returning to the operating system function whereby the operating system function uses the stored value in the segment register to access memory.

12. The method as recited in claim 11 wherein the operating system function generates a memory address reference, the segment register reference referring to a range of memory addresses, wherein the step of generating an exception includes the step of:
   generating the exception when the memory address referenced by the operating system function is not within the range of memory addresses.

13. A method in a computer system for executing an exception handler, the computer system having a segment register containing a reference to a segment of memory, the method comprising the computer-implemented steps of:
   saving the reference contained in the segment register;
   loading the segment register with a predetermined value;
   identifying a cause for execution of the exception handler; and
   when the identified cause is due to the reference in the segment register being different from the predetermined value, returning from execution of the exception handler without loading the saved reference into the segment :register.

14. The method as recited in claim 13 including the step of:
   when the identified cause is not due to the reference in the segment register being different from the predetermined value, reporting an error.

15. The method of claim 13 wherein the computer system has a kernel mode, wherein the step of identifying a cause for execution determines whether the computer system is in kernel mode and the step of returning from execution of the exception handler only returns when the computer system is in kernel mode and the identified cause is due to the reference in the segment register being different from the predetermined value.

16. A method in an operating system for handling interrupts, the computer system having a memory, application programs, an operating system, and a segment register, each application program being either flat or non-flat, a flat application program using a segment that encompasses memory allocated to both the flat application and the operating system, the segment register containing a reference to a segment of memory, the method comprising the computer-implemented steps of:
   when the application program is non-flat, selecting a first interrupt handler for handling an interrupt occurring during the execution of non-flat application programs;
   when the application program is flat, selecting a second interrupt handler for handling an interrupt occurring during the execution of flat application programs; and
   upon occurrence of an interrupt during execution of one of the application programs,
      when the interrupted application program is a non-flat application program, invoking the first interrupt handler wherein the first interrupt handler performs the steps of:
         saving the reference contained in the segment register;
         loading the segment register with a reference to the segment that encompasses memory allocated to both the flat application and the operating system;
         processing the interrupt, and
         restoring the segment register with the saved reference before returning from the interrupt; and
      when the interrupted application program is a flat application program, invoking the second interrupt handler wherein the second interrupt handler processes the interrupt without loading the segment register.

17. The method of claim 16 wherein the computer system has an indicator of whether an application program is flat or non-flat, including the step of determining whether the interrupted application program is a non-flat application program by examining the indicator.

18. A method in an operating system of a computer system for defining interrupt descriptor tables, wherein the computer system has an application program, an operating system, an interrupt descriptor table, a segment register, and a memory, the application program being either flat or non-flat, a flat application program using a segment that encompasses memory allocated to both the flat application and the operating system, the operating system residing in computer memory and containing functions, the interrupt descriptor table identifying an interrupt handler to handle interrupts, the segment register containing a reference to memory, a method comprising the computer-implemented steps of:
creating an interrupt descriptor table for non-flat application programs, the non-flat application program interrupt descriptor table having entries referring to interrupt handler routines for non-flat application programs, wherein each interrupt handler routine for non-flat application programs performs the steps of,
saving the reference contained in the segment register;
loading the segment register with a predetermined value;
processing the interrupt; and
restoring the saved reference into the segment register before returning from the interrupt handler; and
creating an interrupt descriptor table for flat application programs, the flat application program interrupt descriptor table having entries referring to interrupt handler routines for flat application programs, wherein each interrupt handler routine for flat application programs performs the step of processing the interrupt without loading the segment register with a predetermined value.

19. A method in a computer system for ensuring than an exception is generated during execution of an operating system when an application program has loaded a segment register with an invalid value, the method comprising the computer-implemented steps of:
executing an instruction that uses the segment register containing an invalid value to generate an invalid address;
detecting generation of the invalid address;
upon detection of the generation of the invalid address, storing a valid value into the segment register; and
restarting the execution of the instruction wherein a valid address is generated using the valid values.

20. The method of claim 19 wherein the step of detecting generation of the invalid address includes the step of determining whether the generated address is within a range of a segment.

21. The method of claim 19 wherein the step of detecting generation of the invalid address includes the step of determining whether attributes of the segment are appropriate for access by the instruction.

22. The method of claim 19 wherein the step of storing a valid value includes the step of executing an exception handler.

23. A method in a computer system for defining segments within the computer system, the computer system having a memory, the memory having kernel address space and application address space, each segment having a base address and a limit, the method comprising the computer-implemented steps of:
receiving a segment definition from an application program;
when the segment definition contains a non-zero base address, modifying the segment definition so that the limit does not encompass kernel address space and so that an exception is generated when attempting to access the kernel address space using the modified segment definition; and
when the segment definition contains a base address of zero and a limit encompassing a portion of kernel address space, modifying the segment definition so that the limit encompasses the kernel address space and the application address space and so that no exception is generated when attempting to access the kernel address space using the modified segment definition.

24. The method of claim 23 wherein the computer system has an operating system and a segment register, wherein the application program resides in the application address space and the operating system resides in the kernel address space, the segment register referring to a segment, including the steps of:
requesting the operating system to perform an operation, wherein the operating system uses the segment register to perform the operation; and
when the segment register refers to a segment with a limit that does not encompass kernel address space, generating an exception.

25. The method of claim 24 including the step of:
when an exception is generated, changing the reference in the segment register to refer to a segment with a limit that encompasses both the kernel address space and the application address space.

26. The method of claim 23 wherein the computer system has an operating system and a segment register, wherein segments have attributes, wherein the application program resides in the application address space and the operating system resides in kernel address space, the segment register referring to a segment, including the steps of:
when the segment register refers to a segment with a limit encompassing kernel address space, determining if the attributes for the segment referred to by the segment register are acceptable for the operating system operation to be performed;
when the attributes are appropriate for the operating system operation, performing the operating system operation; and
when the attributes are inappropriate for the operating system operation, generating an exception.

27. The method of claim 26 including the step of:
when an exception is generated, changing the reference in the segment register to refer to a segment with attributes appropriate for the operating system operation.

28. A method in a computer system for correcting an error by an application program, the computer system having an operating system and a segment register for referencing memory, the method comprising the computer-implemented steps of:

establishing a plurality of segment register values, a segment register value being either valid or invalid, wherein the computer system automatically generates an exception when the computer system executes an instruction that references the segment register when the segment register contains an invalid value;

invoking the operating system with a segment register with an invalid value;

executing an instruction by the computer system with the invalid value in the segment register;

generating an exception by the computer system in response to the invalid value in the segment register without the operating system explicitly checking the validity of the value in the segment register;

storing a valid value in the segment register; and continuing execution of the instruction.

* * * * *